(12) United States Patent
Imanaka et al.

(10) Patent No.: US 6,679,740 B1
(45) Date of Patent: Jan. 20, 2004

(54) METHOD OF HYDRAULICALLY CONTROLLING A MARINE SPEED REDUCING AND REVERSING MACHINE IN CRASH ASTERN OPERATION

(75) Inventors: Toshio Imanaka, Osaka (JP); Kazuyoshi Harada, Osaka (JP); Takashi Miyamoto, Osaka (JP); Takayuki Sakamoto, Osaka (JP)

(73) Assignee: Yanmar Diesel Engine Co., Ltd., Osaka (JP)

( * ) Notice: Subject to any disclaimer, the term of this patent is extended or adjusted under 35 U.S.C. 154(b) by 0 days.

(21) Appl. No.: 10/070,636
(22) PCT Filed: Sep. 4, 2000
(86) PCT No.: PCT/JP00/06006
§ 371 (c)(1), (2), (4) Date: Jun. 4, 2002
(87) PCT Pub. No.: WO01/17849
PCT Pub. Date: Mar. 15, 2001

(30) Foreign Application Priority Data

Sep. 2, 1999 (JP) .......................... 11-248599
Mar. 17, 2000 (JP) .......................... 2000-75217

(51) Int. Cl.[7] ............................................ B63H 20/14
(52) U.S. Cl. ........................ 440/75; 440/86; 440/87; 192/51
(58) Field of Search .................. 440/86, 87, 84, 440/75; 192/21, 51, 48.7, 48.91, 54.1, 54.3, 55.1, 56.1, 56.3, 59, 65, 103 R, 150; 74/336 R, 337, 344, 346, 364

(56) References Cited

U.S. PATENT DOCUMENTS

| | | | | | |
|---|---|---|---|---|---|
| 3,548,987 A | * | 12/1970 | Erickson | .................. | 192/104 F |
| 3,669,234 A | * | 6/1972 | Mathers | ...................... | 477/92 |
| 3,905,459 A | * | 9/1975 | Liebich | .................. | 192/109 F |
| 3,919,964 A | * | 11/1975 | Hagen | .......................... | 440/75 |
| 4,051,679 A | * | 10/1977 | Collin | .......................... | 60/656 |
| 4,125,039 A | * | 11/1978 | Helm | .......................... | 477/111 |
| 4,186,829 A | * | 2/1980 | Schneider et al. | ....... | 192/109 F |
| 4,289,222 A | * | 9/1981 | Esthimer | ..................... | 477/175 |
| 4,305,710 A | * | 12/1981 | Schneider | ..................... | 440/75 |
| 4,451,238 A | * | 5/1984 | Arnold | ......................... | 440/75 |
| 4,459,873 A | * | 7/1984 | Black | .......................... | 74/720 |
| 4,558,769 A | * | 12/1985 | Neisen | ..................... | 192/3.31 |
| 4,688,665 A | * | 8/1987 | Rowen | ..................... | 477/176 |
| 4,887,984 A | * | 12/1989 | Newman | ..................... | 440/86 |

(List continued on next page.)

FOREIGN PATENT DOCUMENTS

| | | |
|---|---|---|
| JP | 51-18091 | 2/1976 |
| JP | 52-27436 | 7/1977 |
| JP | 56-40079 | 9/1981 |

(List continued on next page.)

OTHER PUBLICATIONS

International Search Report dated Nov. 17, 2000.

Primary Examiner—S. Joseph Morano
Assistant Examiner—Ajay Vasudeva
(74) Attorney, Agent, or Firm—Knobbe, Martens, Olson & Bear LLP

(57) ABSTRACT

In carrying out a crash-go-astern operation for switching operating means (2a) of a hydraulic clutch mechanism (100) provided to a marine reduction and reverse gear (1) from a forward setting (F) to a reverse setting in a stroke so as to abruptly stop in traveling ahead, a propeller speed (PN) is detected in neutral (N) halfway through the switching and initial fitting pressure (Po) of a reverse driving clutch (90) is calculated by using a map of the initial fitting pressure (Po) of reverse clutch pressure (Pr) formed according to the propeller speed based on a ship load (SL) in advance before switching to the reverse setting (R), the reverse driving clutch (90) is set at the calculated initial fitting pressure (Po) when the operating means is switched to the reverse setting (R), and then the reverse clutch pressure (Pr) is increased to a maximum value (Pm) as an engine speed (EN) increases.

19 Claims, 16 Drawing Sheets

U.S. PATENT DOCUMENTS

| | | | | |
|---|---|---|---|---|
| 5,018,996 A | * | 5/1991 | Newman et al. | 440/75 |
| 5,085,302 A | * | 2/1992 | Kriesels | 192/51 |
| 5,108,324 A | * | 4/1992 | Adams et al. | 440/75 |
| 5,474,480 A | * | 12/1995 | Schwarz et al. | 440/86 |
| 6,035,989 A | * | 3/2000 | Matsuoka | 192/85 AA |
| 6,123,591 A | * | 9/2000 | Onoue | 440/75 |
| 6,443,286 B1 | * | 9/2002 | Bratel et al. | 192/85 AA |

FOREIGN PATENT DOCUMENTS

| | | | | |
|---|---|---|---|---|
| JP | 60-139596 | | 7/1985 | |
| JP | 61135899 A | * | 6/1986 | B63H/23/30 |
| JP | 61241532 A | * | 10/1986 | F16D/25/11 |
| JP | 01283452 A | * | 11/1989 | F16H/5/12 |
| JP | 04-019428 | | 1/1992 | |
| JP | 04-159195 | | 6/1992 | |
| JP | 5-504316 | | 7/1993 | |
| JP | 06201030 A | * | 7/1994 | F16H/61/00 |
| JP | 06-68291 | | 8/1994 | |
| JP | 06-68293 | | 8/1994 | |
| JP | 09-249196 | | 9/1997 | |
| JP | 09-250564 | | 9/1997 | |
| JP | 09-250568 | | 9/1997 | |
| JP | 10-278890 | | 10/1998 | |
| JP | 10278890 A | * | 10/1998 | B63H/23/30 |
| JP | 11-182582 | | 7/1999 | |
| JP | 2001018891 A | * | 1/2001 | B63H/21/21 |
| JP | 2001260988 A | * | 9/2001 | B63H/23/30 |
| WO | WO92-11472 | | 7/1992 | |

\* cited by examiner

METHOD OF HYDRAULICALLY CONTROLLING A MARINE SPEED REDUCING AND REVERSING MACHINE IN CRASH ASTERN OPERATION

CROSS-REFERENCE TO RELATED APPLICATIONS

This is the United States National Phase under 35 U.S.C. § 371 of International Application No. PCT/JP/00/06006 filed Sept. 4, 2000, which claims priority to Japanese Patent Application Nos. JP 11-248599, filed Sept. 2, 1999 and JP 2000-75217, filed Mar. 17, 2000, the disclosures of which are herein incorporated by reference in their entireties.

TECHNICAL FIELD

The present invention relates to a hydraulic control method of a marine reduction and reverse gear in a crash-go-astern operation for switching a clutch in the marine reduction and reverse gear from a forward set state to a reverse set state so as swiftly stop a ship traveling ahead.

BACKGROUND ART

In order to swiftly stop a traveling ship and to switch the ship from traveling ahead to traveling astern in some cases, an operation called a crash-go-astern operation for instantaneously switching a clutch of a marine reduction and reverse gear from a forward set state to a reverse set state (to be more precise, the clutch goes through a neutral state instantaneously at one time between the forward set state and the reverse set state) is carried out conventionally. In other words, by switching the clutch to one for reverse driving, a reverse driving force is applied to a propeller which is rotating forward to brake. However, because a load is suddenly applied to an engine when the clutch is switched from the intermediate neutral state to the reverse set state, there is a fear of stalling. Therefore, in prior-art control, a threshold value for avoiding stalling is asset for each degree of a set engine speed during execution of the crash-go-astern operation, the clutch which has been switched to the reverse set state is returned to the neutral state if an actual engine speed is lower than the threshold value, and the clutch is switched to the reverse set state after the actual engine speed increases to some degree. In another case, a certain threshold value with regard to an engine load is set, a state of the engine load is detected, the clutch is similarly returned to the neutral state if the engine load is over the threshold value when the crutch is switched to the reverse setting to show a state of an overload with a fear of stalling, and the clutch is returned to the reverse setting after the state of the engine load gets out of the overload state.

In these methods, however, the clutch is switched again to the neutral state if the actual engine speed exceeds the threshold value again or the engine shows the overload state again after the clutch has been returned to the reverse set state. When the clutch is in the neutral state, external forces other than water do not act on the ship, i.e., a braking force is not applied. Because engagement and disengagement of the clutch are repeated until the actual engine speed increases sufficiently or until the engine gets out of the overload state as described above, considerable time is required for stopping the ship and an essential purpose of the crash-go-astern operation, i.e., an abrupt stop of the ship cannot be achieved satisfactorily.

SUMMARY OF THE INVENTION

In the present invention, as a hydraulic clutch control method of a marine reduction and reverse gear in a crash-go-astern operation for switching operating means of a hydraulic clutch mechanism provided to the marine reduction and reverse gear from a forward setting to a reverse setting in a stroke so as to abruptly stop a ship traveling ahead, fitting pressure of a reverse driving clutch is maintained for a while at standby clutch pressure set between a minimum value and a maximum value and appropriate for avoiding stalling if it is judged that there is a fear of the stalling due to a shock of clutch switching in the operation and the fitting pressure of the reverse driving clutch is increased if it is judged that there is no fear of the stalling.

As described above, because the clutch is not brought into the neutral state completely but the reverse driving clutch is fitted at the standby clutch pressure in avoiding the stalling, the reverse driving force due to the clutch fitting is applied to the propeller which is rotating forward as a braking force and time required for stopping the ship can be shortened.

As timing of hydraulic control of the reverse driving clutch and judgement of stalling, in the first policy, the fitting pressure of the reverse driving clutch is first increased to the maximum value as a target when the operating means of the hydraulic clutch mechanism is switched to the reverse setting in the crash-go-astern operation and the fitting pressure is reduced to the standby clutch pressure if it is judged that there is the fear of the stalling in a process of increasing of the fitting pressure.

A threshold value of an engine speed is set as a criterion of judgement of a state in which there is the fear of the stalling and a detected engine speed and the threshold value are compared with each other.

It is also possible that a threshold value of a load applied to an engine is set and a detected degree of a load applied to the engine and the threshold value are compared with each other.

It is also possible that an engine speed and a ship velocity are detected.

It is also possible that the standby clutch pressure is increased and reduced repeatedly at or below the maximum value of the clutch fitting pressure as an upper limit to apply the braking force to the propeller in stages or to eliminate the load applied to the engine in stages.

The increase in the fitting pressure of the reverse driving clutch based on a judgement of a state in which there is no fear of the stalling may be carried out according to an increase in an engine speed or a reduction in an engine load. As described above, by automatically controlling to increase working hydraulic pressure of the reverse driving clutch, it is possible to save time and effort for a valve switching operation and to fit the reverse driving clutch in an optimum pressure increasing pattern to effectively apply the reverse driving force as the braking force to the propeller.

In the invention, in the crash-go-astern operation for switching operating means of a hydraulic clutch mechanism provided to the marine reduction and reverse gear from a forward setting to a reverse setting in a stroke so as to abruptly stop in traveling ahead, initial fitting pressure of a reverse driving clutch is calculated from certain criterion of judgement of a ship in advance before the switching to the reverse setting and the reverse driving clutch is set at the calculated initial fitting pressure when the operating means has been switched to the reverse setting.

As a result, the judgement for avoiding the stalling is made before the reverse setting to avoid a delay in control. Because the fitting pressure of the reverse driving clutch is set at the calculated initial fitting pressure as soon as the operating means is switched to the reverse setting, the stalling can be avoided and the effective reverse driving force as the braking force can be applied to the propeller to shorten time required for stopping the ship.

The criterion of judgement is a propeller speed when the clutch mechanism is switched from the forward setting to a neutral state by the crash-go-astern operation to make the judgement for avoiding the stalling before the reverse setting.

Furthermore, calculation of the initial fitting pressure is performed based on a setting map of the initial fitting pressure corresponding to the propeller speed detected in the neutral state and the map is formed based on a load characteristic intrinsic to a ship. In other words, by only detecting the engine conditions such as the engine load and the engine speed, it is impossible to judge the drop amount of the engine speed in fitting of the reverse driving clutch which is different depending on the characteristic of a ship load of each the ship and a deviation of the calculated initial fitting pressure from the actual proper value may be generated. In the invention, by forming the map based on the load characteristic intrinsic to the ship, the proper initial fitting pressure for each the ship can be set and the effective crash-go-astern operation can be achieved.

After the reverse setting, the initial fitting pressure is increased to a maximum value according to an increase in an engine speed. As described above, by automatically controlling to increase working hydraulic pressure of the reverse driving clutch, it is possible to save time and effort for a valve switching operation and to fit the reverse driving clutch in an optimum pressure increasing pattern to effectively apply the reverse driving force as the braking force to the propeller.

In order to cope with cases in which the load characteristic intrinsic to the ship cannot be specified or there is a deviation of an estimated value from an actual value, the estimated load characteristic intrinsic to the ship is corrected according to a drop amount of an actual engine speed when the reverse driving clutch is set at the initial fitting pressure and the map is corrected according to the corrected load characteristic.

Moreover, the correction of the load characteristic intrinsic to the ship is repeated until the drop amount of the actual engine speed when the reverse driving clutch is set at the initial fitting pressure converges into a target range to thereby form a more accurate map to achieve the effective crash-go-astern operation. In this case, it is also possible that the number of corrections of the load characteristic intrinsic to the ship is set in advance.

The load characteristic intrinsic to the ship may change due to secular changes and the like of the ship. Therefore, the correction of the load characteristic intrinsic to the ship is carried out again when the drop amount of the engine speed which has converged into the target range at one time deviates again from the target range.

Above and other objects, features, and effects of the invention will become apparent from the following descriptions based on the accompanying drawings.

BEST MODE FOR CARRYING OUT THE INVENTION

Figure 1:
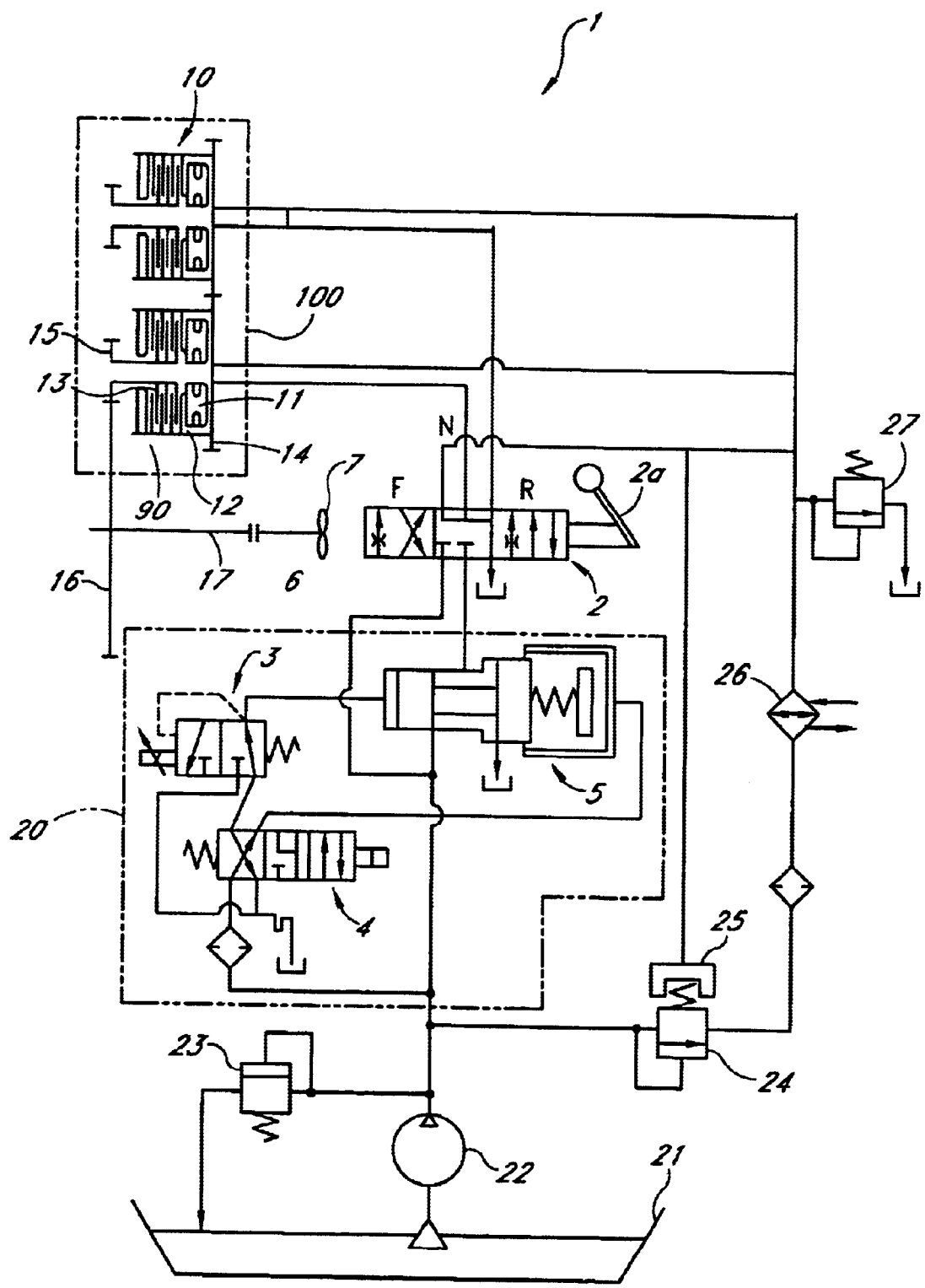
FIG. 1 shows an oil hydraulic circuit of a marine reduction and reverse gear suitable for a crash-go-astern control according to the present invention.
Figure 2:
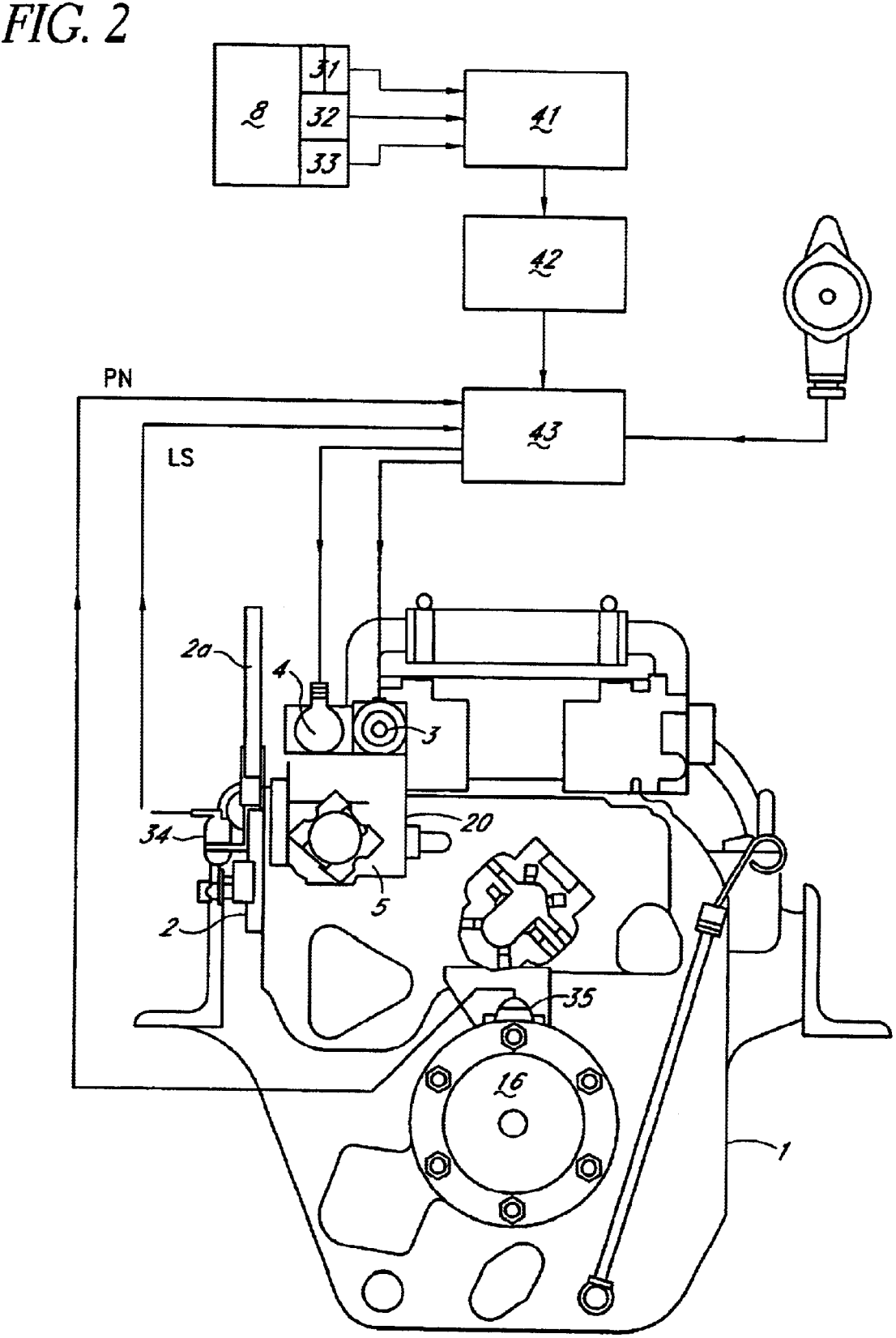
FIG. 2 is a block diagram of a crash-go-astern control structure according to the invention.

First an oil hydraulic circuit of a marine reduction and reverse gear 1 (an outward appearance of which is shown in FIG. 2) shown in FIG. 1 will be described. A forward driving clutch (forward clutch 10) and a reverse driving clutch (reverse clutch) 90 are disposed in parallel to form a clutch mechanism 100. Both the forward clutch 10 and the reverse clutch 90 are clutches engaged when pressure oil is supplied to the clutches. By switching a position of a forward/reverse change-over valve 2 (an outward appearance of which is shown in FIG. 2) by operating a clutch lever 2a attached to the forward/reverse change-over valve 2 to switch where to supply the pressure oil, the clutch mechanism 100 can be switched among three states, i.e., a forward set state in which the forward clutch 10 is engaged and the reverse clutch 90 is disengaged, a reverse set state in which the reverse clutch 90 is engaged and the forward clutch 10 is disengaged, and a neutral state in which both the clutches 10 and 90 are not supplied with the pressure oil and disengaged.

A common structure of the forward clutch 10 and the reverse clutch 90 will be described in detail. Each the clutch is a wet multiple disc clutch in which steel plates 12 and friction discs 13 are disposed alternately. By actuating a hydraulic piston 11 with pressure oil supplied by the forward/reverse change-over valve 2, each the steel plate 12 is pressed against each the friction disc 13. If the pressure oil is drawn into the forward/reverse change-over valve 2, the hydraulic piston 11 is returned to an initial position by biasing force and each the steel plate 12 is disengaged from each the friction disc 13. All the friction discs 13 of each the clutch 10, 90 are connected to an inner gear (pinion gear) 15 and the steel plates 12 are connected to an outer gear 14 rotated by, engine power irrespective of engagement and disengagement of the clutch. If the clutch is engaged, i.e., the steel plates 12 and the friction discs 13 are pressed against each other, the inner gear 15 in each the clutch rotates integrally with the outer gear 14 to rotate a large gear 16 engaged with the inner gear 15. The large gear 16 is fixed to an out put shaft 17 of the marine reduction and reverse gear 1 and an output terminal of the output shaft 17 projecting outside the marine reduction and reverse gear 1 and an input terminal of a propeller shaft 6 having a propeller 7 are connected to each other as shown in FIG. 2. Thus, rotation of the large gear 16 is transferred to the propeller 7. In other words, power of an engine 8 shown in FIG. 2 is transferred to the propeller 7 through the forward clutch 10 or the reverse clutch 90 of the clutch mechanism 100.

By adjusting pressing force (clutch hydraulic pressure) of the hydraulic piston 11 in each of the forward clutch 10 and the reverse clutch 90, the friction discs 13 can be caused to slip on the steel plates 12 to obtain a half-clutch state. The clutch hydraulic pressure is controlled by an electronic trolling device 20 (which is surrounded by a two-dot chain line in FIG. 1 and an outward appearance of which is shown in FIG. 2) having a direct-coupled solenoid valve 3, a solenoid proportional valve 4, and a low-speed valve 5. This structure will be described.

Discharged oil of an oil pump 22 is supplied to one of the forward clutch 10 and the reverse clutch 90 through the low-speed valve 5 and the forward/reverse change-over valve 2 forward or reverse setting of the clutch, i.e., the clutch lever 2a of the forward/reverse change-over valve 2 is in a forward position or a reverse position. At this time, if the direct-coupled solenoid valve 3 is in a direct coupling set position as shown in FIG. 1, by using pressure oil sent from the direct-coupled solenoid valve 3 as pilot hydraulic pressure, pressure sent from the low-speed valve 5 corresponds to specified clutch hydraulic pressure, sufficient specified clutch hydraulic pressure is generated in the forward clutch 10 or the reverse clutch 90 supplied with pressure oil such that the steel plates 12 and the friction discs 13 are pressed against each other without slipping and that the hydraulic piston 11 is fully pressed, and power from the outer gear 14 is fully transferred to the inner gear 15.

If the direct-coupled solenoid valve 3 is in an opposite position to the position shown in FIG. 1, pressure oil is introduced into the low-speed valve 5 through the solenoid proportional valve 4. As this pressure oil functions as the pilot hydraulic pressure, a sent amount from the low-speed valve 5 is adjusted by duty control of the solenoid proportional valve 4, the clutch hydraulic pressure of the forward clutch 10 or the reverse clutch 90 supplied with the pressure oil is adjusted to be the specified pressure or lower, and a slippage of the friction disc 13 on the steel plate 12 is adjusted. In other word, by the switch of the direct-coupled solenoid valve 3 and adjustment of a current value of the solenoid proportional valve 4, fitting pressure of the forward clutch 10 or the reverse clutch 90 is adjusted.

Discharged oil of the oil pump 22 is supplied to the electronic trolling device 20 after hydraulic pressure of the discharged oil is adjusted through a clutch hydraulic pressure adjusting valve 24. Surplus pressure oil is supplied as lubricating oil to both the clutched 10 and 90 from the clutch hydraulic pressure adjusting valve 24 through an oil cooler 26 and a lubricating oil pressure adjusting valve 27.

A position of the clutch hydraulic pressure adjusting valve 24 is controlled by hydraulic control of a loose-fitting valve 25 to adjust valve-opening specified pressure of the valve 24. The loose-fitting valve 25 is hydraulically connected to the forward/reverse change-over valve 2 and returns to an initial position when the forward/reverse change-over valve 2 is in a neutral position to make the valve-opening specified pressure of the clutch hydraulic pressure adjusting valve 24 small in the neutral state. Immediately after the forward/reverse change-over valve 2 is switched to the forward position or the reverse position, a part of the sent oil from the forward/reverse change-over valve 2 is gradually sent to the loose-fitting valve 25 to gradually increase the valve-opening specified pressure of the forward/reverse change-over valve 2 and eventually increase the pressure to valve-opening specified pressure in normal forward/reverse traveling. As a result because the hydraulic pressure of the clutch 10 or 90 gradually rises when a navigating mode is switched from the neutral state to a forward traveling setting or a reverse traveling setting, it is possible to prevent abrupt starting. In a crash-go-astern operation, although the mode goes through the neutral state when it is switched from the forward traveling setting to the reverse traveling setting, the loose-fitting valve 25 does not return to the initial position in the neutral state because the neutral state is only instantaneous. Therefore, when the mode is switched to the reverse traveling setting, the position of the loose-fitting valve 25 is not changed from the position in the forward traveling setting and the rise in the clutch hydraulic pressure of the reverse clutch 90 is not delayed.

In FIG. 1, a reference numeral 21 designates a strainer and a reference numeral 23 designates a safety valve for returning the discharged oil of the oil pump 22 to the Strainer 21 in an emergency.

Next, a clutch control structure of the marine reduction and reverse gear for achieving a crash-go-astern control according to the invention will be described by using FIG. 2.

An engine speed sensor 31 for detecting an actual speed of the engine 8 is attached to the engine 8 and a rack position sensor 32 for detecting a position of a control rack of a governor attached to the engine 8 is attached to the engine 8. Furthermore, a black smoke sensor 33 for detecting an amount of black smoke in exhaust is attached in an exhaust pipe of the engine 8.

A signal of an actual engine speed (EN) detected by the engine speed sensor 31, a signal of the rack position detected by the rack position sensor 32, a signal indicating the amount of black smoke detected by the black smoke sensor 33, and a load signal indicating a load applied to the engine 8 and calculated based on the these sensors and the like are input into an engine condition analyzing circuit 41. Threshold values of the respective signals are set in the engine condition analyzing circuit 41 and a detection signal is transmitted from the engine condition analyzing circuit 41 to a main controller 42 when each the detection signal value exceeds the threshold value. As this transmitting means, data communications such as a radio communication are employed, for example.

The main controller 42 carries out various controls based on the detection signals with regard to various conditions of the engine and sent from the engine condition analyzing circuit 41. As one of the controls, the main controller 42 transmits a control signal based on the detection signals from the engine condition analyzing circuit 41 to a trolling controller 43.

Into the trolling controller 43, besides the signals from the main controller 42, a set propeller speed signal S5 indicating a set value of a propeller speed by a trolling dial 9, a detection signal (clutch lever position signal) LS of a position of the clutch lever 2a of the forward/reverse change-over valve 2 by a clutch signal sensor 34, and an output speed (propeller speed PN) signal detected by a propeller speed sensor 35 attached to the output shaft 17 are input. From the trolling controller 43, ON/OFF signals (the trolling OFF signal refers to a signal for setting the direct-coupled solenoid valve 3 in the above-described direct coupling set position and the trolling ON signal refers to a signal for setting the direct-coupled solenoid valve 3 in the opposite position to the direct coupling set position to achieve adjustment of the clutch hydraulic pressure by the solenoid proportional valve 4) of trolling is output to the direct-coupled solenoid valve 3 and a duty value for determining a valve opening degree of the solenoid proportional valve 4 is output to the valve 4.

The crash-go-astern control of the invention is for getting out of the neutral state of the clutch mechanism 100 swiftly without stalling to achieve reverse traveling by determining the clutch hydraulic pressure of the reverse clutch 90 which can be set variously by the direct-coupled solenoid valve 3 and the solenoid proportional valve 4 as described above based on various conditions when the clutch lever 2a is switched to the reverse position.

First the crash-go-astern controls according to prior art and the invention based on detection of the engine speed when the clutch mechanism 100 is switched to the reverse set state (when the clutch lever 2a is switched to the reverse position R) will be described by using FIGS. 3 to 5.

Figure 3:
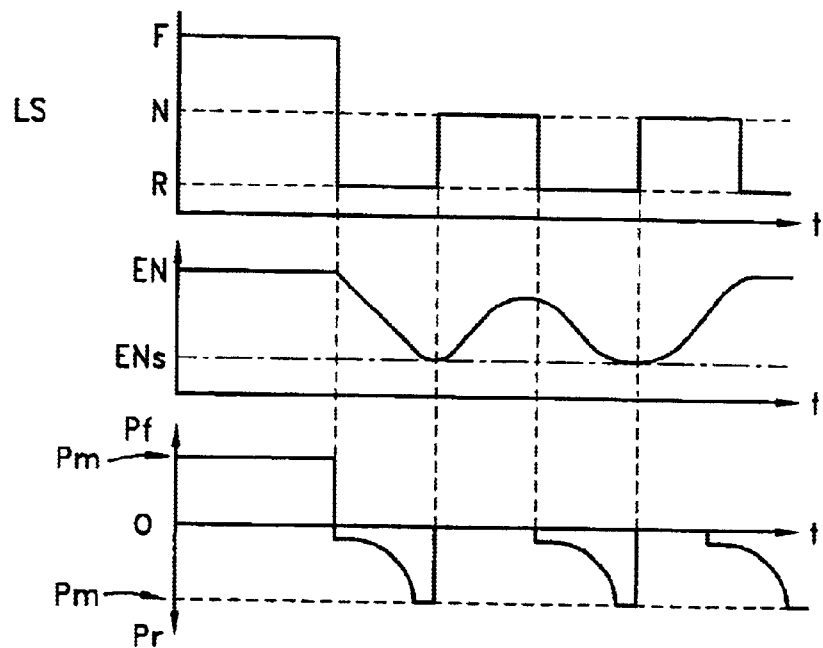
FIG. 3 shows an engine speed and clutch hydraulic fluid over time during a prior-art crash-go-astern operation.

As shown in FIG.3 and the like, the clutch lever position signal value LS is switched with the passage of time t from a signal value F indicating a state in which the clutch lever 2a is in the forward position through a signal value N indicating a state in which the lever 2a is in the neutral position to a signal value R indicating a state in which the lever 2a is in the reverse position by the crash-go-astern operation.

Through such the crash-go-astern operation by the clutch lever 2a, clutch hydraulic pressure Pf of the forward clutch 10 changes from a maximum value Pm in forward traveling to a minimum value (zero, for the sake of convenience) for maintaining the clutch neutral state in reverse traveling and then remains at Pf=0.

On the other hand, clutch hydraulic pressure Pr of the reverse clutch 90 is a minimum value (zero, similarly for the sake of convenience) in settings of forward and neutral. When the clutch lever 2a is switched to the reverse position, the reverse clutch 90 is fitted at the maximum value Pm at one time. However, if conditions which may cause stalling (e.g., the engine speed lower than the threshold value, an overload of the engine, and an insufficient reduction in forward speed) are detected, the clutch hydraulic pressure Pr is reduced to clutch hydraulic pressure (standby clutch hydraulic pressure) Pw for standby.

Conventionally, as shown in FIG. 3, the clutch hydraulic pressure Pr of the reverse clutch 90 during standby is zero (i.e., neutral state). In this state, because external forces other than water drag do not act on a ship, braking force does not act sufficiently on the ship (propeller 7) and it takes much time to stop a ship. Moreover, conventionally, a manual operation of returning the clutch lever 2a to the neutral position N every time to make the clutch hydraulic-pressure Pr zero and switching the clutch lever 2a to the reverse position R if the engine speed increases to some degree or the engine load reduces to some degree is required and such an operation is complicated. Although a criterion of judgement of if the clutch hydraulic pressure Pr is reduced to the standby value is the actual engine speed EN in a case shown in FIG. 3, the same is true when the engine load is used as the criterion.

Figure 4:
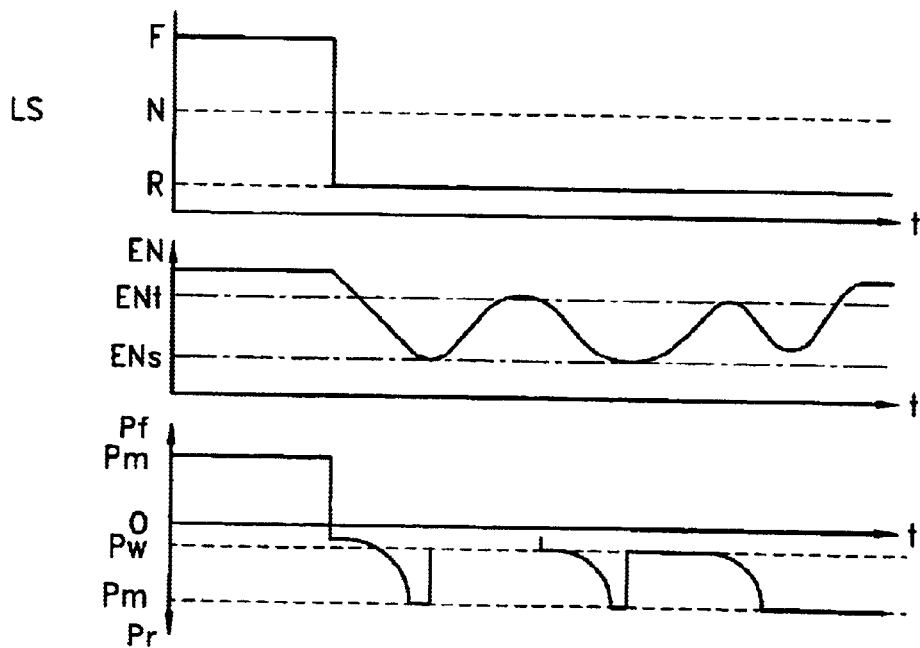
FIG. 4 shows an engine speed and clutch hydraulic pressure over time during the crash-go-astern operation when detection of the engine speed is used.

In the invention, on the other hand, by setting the standby clutch pressure Pw at a value higher than zero in a range in which stalling can be avoided as shown in FIG. 4 and the like, braking performance is enhanced because slight reverse driving force is applied to the propeller 7 during standby for avoiding the stalling and, as a result, time required to stop the ship can be shortened.

Figure 5:
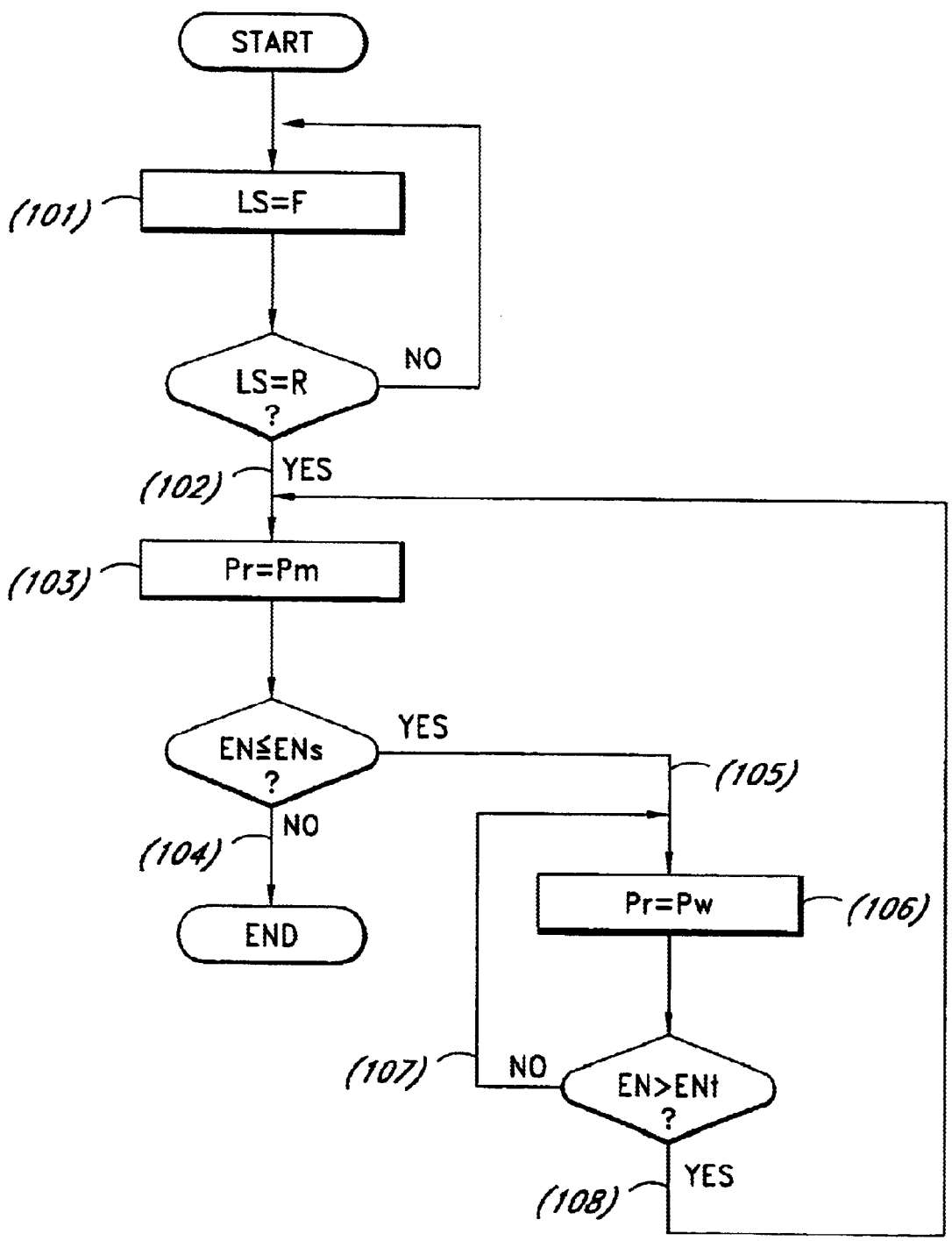
FIG. 5 is a flow chart of a clutch hydraulic control in the crash-go-astern operation based on detection of the engine speed according to the invention.

FIG. 4 shows progressions of the engine speed and the clutch pressure when the control of the clutch hydraulic pressure Pr in the crash-go-astern operation is carried out based on detection of the engine speed and FIG. 5 is a flowchart of the control. In the above-described engine condition analyzing circuit 41, a map of a set value of the standby clutch hydraulic pressure Pw at the time of the reverse clutch pressure Pr based on the detected engine speed EN is stored. The detected value of the engine speed sensor 31 is input into the engine condition analyzing circuit 41. If the detected value EN is lower than the threshold value ENs, setting the clutch hydraulic pressure Pr at the standby clutch pressure Pw and the set value of the standby clutch pressure Pw are transmitted to the main controller 42 based on the map, based on which the switching signal of the direct-coupled solenoid valve 3 and the duty value of the solenoid proportional valve 4 are output from the main controller 42 through the trolling controller 43.

A course of the hydraulic control shown in FIG. 5 will be described by reference to a graph in FIG. 4. In the engine condition detecting circuit 41, while the clutch lever 2a is in the forward position (step 101), i.e., while the forward clutch 10 is fitted, the threshold value ENs of the engine speed for avoiding stalling is determined based on the set engine speed. If the clutch lever 2a which has been in the forward position F is switched to the reverse position R in the crash-go-astern operation (step 102), the clutch hydraulic pressure Pr is increased toward the maximum value Pm to engage the reverse clutch 90 (step 103). If the actual engine speed EN (detected by the engine speed sensor 31) which has reduced due to the clutch engagement does not reach the threshold value ENs for avoiding stalling (step 104), the reverse clutch hydraulic pressure Pr is raised to the maximum value Pm in this state. If the detected engine speed EN has reduced to the threshold value ENs (step 105), the engine condition detecting circuit 41 transmits a signal indicating this condition to the main controller 42. At the time, a control signal is transmitted from the main controller 42 through the trolling controller 43 to the solenoid proportional valve 4 to reduce the clutch hydraulic pressure Pr to the standby clutch pressure Pw (step 106) to wait an increase in the engine speed EN. Unless the engine speed EN increases to a reference value ENt, the reverse clutch hydraulic pressure Pr is maintained at the standby clutch pressure Pw (step 107). If the engine speed EN which has increased reaches the reference value ENs, the clutch hydraulic pressure Pr is raised again toward the maximum value Pm (step 108). If EN·ENs again because of the reduction in the engine speed EN due to the increase in the hydraulic pressure, the reverse clutch pressure Pr is reduced again to the standby clutch pressure Pw to wait an increase in the engine speed.

Not only the employment of the reference value ENt of the engine speed EN which has increased as described above but also employment of timer control can also be considered to raise the reverse clutch hydraulic pressure Pr from the standby clutch pressure Pw to the maximum value Pm. In other words, the reverse clutch hydraulic pressure Pr is maintained at the standby clutch pressure Pw and increased to the maximum value Pm when proper amount of time has elapsed.

The standby clutch pressure Pw may be set at a constant value or may be set according to the engine speed EN detected by the engine speed sensor 31. In other words, if the engine speed EN is high, the standby clutch pressure Pw is set at a slightly large value. Then, when the engine speed EN has fully risen over ENs, standby time until the reverse clutch 90 is formally fitted when the clutch hydraulic pressure Pr is the maximum value Pm is shortened and a shock in fitting of the clutch is avoided. If the engine speed EN is low, the standby clutch pressure Pw is set at a slightly small value. During standby, the load applied to the engine from the reverse clutch 90 side is minimized to avoid a further reduction in the engine speed to prevent stalling.

In increasing the reverse clutch pressure Pr which has been reduced to the standby clutch pressure Pw at one time, it is possible to gradually increase the reverse clutch pressure Pr according to the value of the increasing engine speed EN. In this manner, an optimum pressure increasing pattern is obtained automatically without manually switching the valve. In this case, by using a correlation map between the above-described engine speed EN and standby clutch pressure Pw, a value of the standby clutch pressure Pw corresponding to the increasing engine speed EN can be used as the reverse clutch pressure Pr.

It is also possible that the criterion of judgement of the standby clutch pressure Pw is the engine load EL detected by the rack position sensor 32 and the black smoke sensor 33 instead of the engine speed EN. In other words, in the above-described engine condition analyzing circuit 41, a load threshold value Els (over which, the engine is overloaded and there is a fear of stalling) and a set value of the standby clutch pressure Pw corresponding to the signal value of the engine load detected by these sensors 32, 33, and the like are stored. In this case, the standby clutch pressure Pw may be set according to a degree of the engine load exceeding the load threshold value ELs. The higher the engine load, the smaller value the set value of the standby clutch pressure Pw is set at to thereby reduce a percentage of the load transferred from the propeller 7 to the engine.

Figure 6:
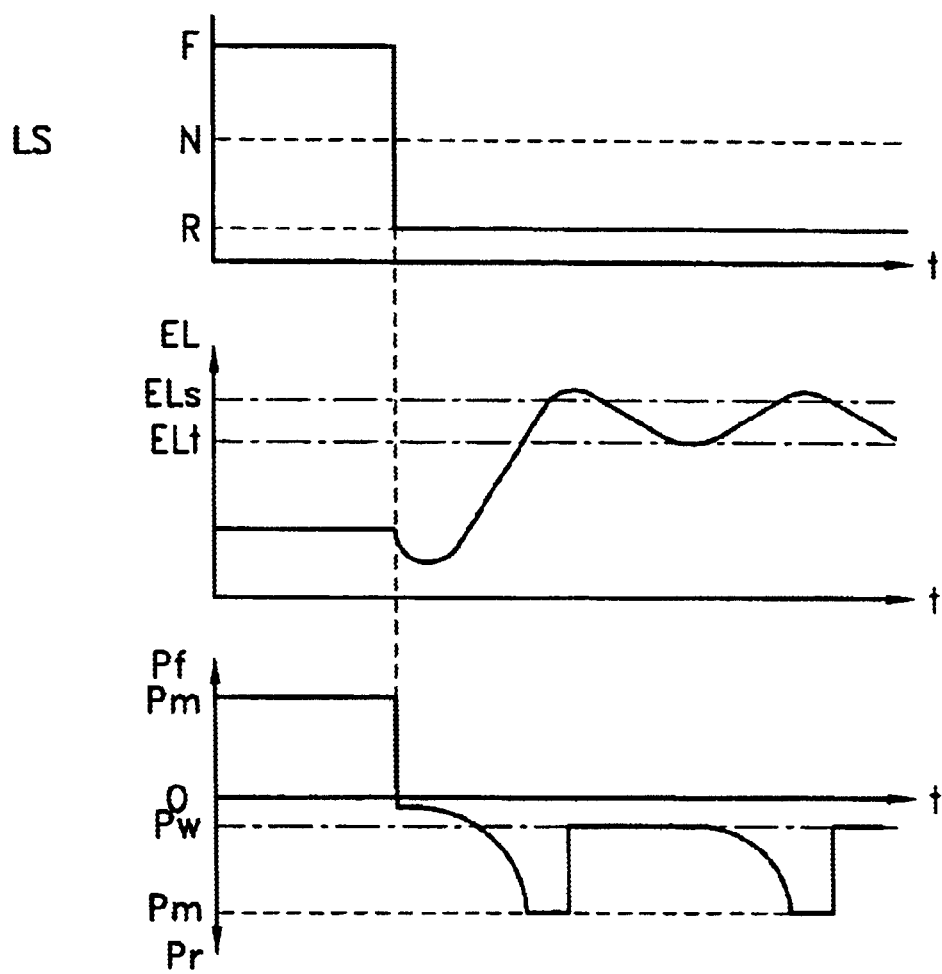
FIG. 6 shows a clutch lever signal value, an engine load, and the clutch hydraulic pressure over time during the crash-go-astern operation when detection of the engine load is used.
Figure 7:
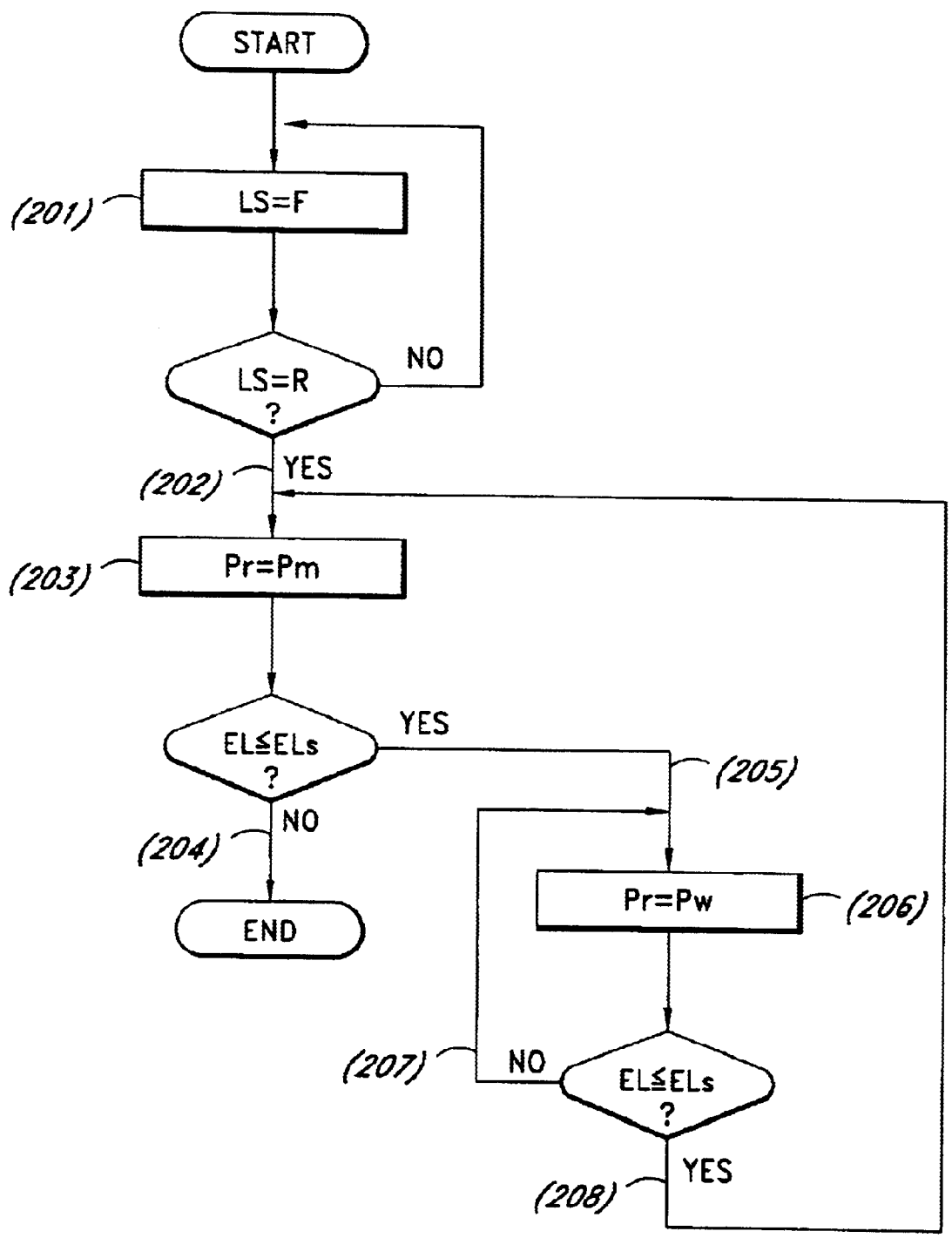
FIG. 7 is a flow chart of the clutch hydraulic control in the crash-go-astern operation based on detection of the engine load according to the invention.

FIG. 6 shows progressions of the engine load and the clutch pressure in the clutch hydraulic pressure control in the crash-go-astern operation based on detection of the engine load and FIG. 7 is a flow chart of the control. In the crash-go-astern operation, after the reverse clutch 90 is fitted (steps 201 to 202), the reverse clutch pressure Pr is raised to the maximum value Pm (step 203). If it is found that the engine load EL has exceeded the load threshold value ELs and the engine has been brought into the overloaded state due to a shock of the fitting (step 205), a command for reducing the clutch pressure Pr of the reverse clutch 90 to the standby clutch pressure Pw is output to the main controller 42, a switching signal of the direct-coupled solenoid valve 3 and a duty value of the solenoid proportional valve 4 are output from the main controller 42 through the trolling controller 43, the clutch pressure Pr of the reverse clutch 90 is set at the standby clutch pressure Pw (step 206), and the standby clutch pressure Pw is maintained until the detected engine load EL reduces to a certain reference value ELt (step 207). If the detected engine load EL reduces below the reference value ELt the reverse clutch pressure Pr is raised to the maximum value Pm (step 208). If the engine load EL increasing again due to the raising of the hydraulic pressure does not exceed the load threshold value ELs, the reverse clutch 90 is fitted at the maximum value Pm of the reverse clutch pressure Pr (step 203). The reverse clutch pressure Pr is reduced again to the standby clutch pressure Pw if the engine load EL exceeds the load threshold value ELs (step 205). The reverse clutch pressure Pr is increased to the maximum value Pm if the engine load EL does not exceed the load threshold value ELs (step 204). It is also possible to control a length of time that the standby clutch pressure Pw is maintained by a timer to increase the reverse clutch pressure Pr from the standby clutch pressure Pw to the maximum value Pm without using the engine load reference value ELt.

In the control of the reverse clutch pressure Pr based on the engine load, it is also possible to gradually increase the reverse clutch pressure Pr according to the reducing value of the engine load EL in increasing the reverse clutch pressure Pr which has been reduced to the standby clutch pressure Pw at one time to the maximum value Pm. In this manner, an optimum pressure increasing pattern is obtained automatically without manually switching the valve. When the standby clutch pressure Pw is changed according to the engine load EL as described above, by using a correlation map between the engine load EL and the standby clutch pressure Pw, a value of the standby clutch pressure Pw corresponding to the increasing engine load EL can be used as the reverse clutch pressure Pr.

Figure 8:
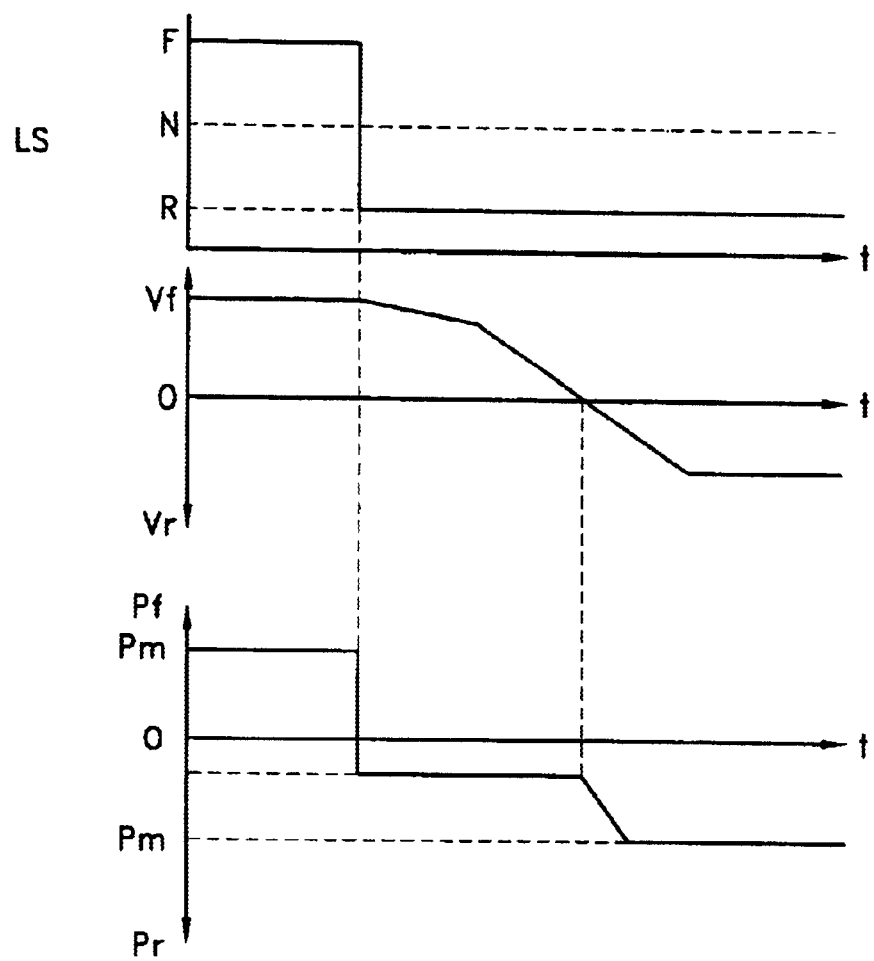
FIG. 8 shows the clutch lever signal value, a ship velocity, and the clutch hydraulic pressure over time during the crash-go-astern operation when detection of the engine speed and the ship velocity is used.

FIG. 8 shows a progression of the clutch hydraulic pressure in the crash-go-astern operation based on a correlation value between the engine speed EN and a ship velocity V. The higher a forward ship. velocity Vf at a start of execution of the crash-go-astern operation, the larger the load applied to the propeller 7 in switching the clutch from forward to reverse is. However, even if the forward ship velocity Vf is high, a possibility of stalling is reduced if the engine speed EN is large. Conversely, if the ship velocity has been sufficiently reduced, the threshold value ENs of the engine speed EN can be reduced and a possibility that the reverse clutch pressure Pr does not need to be reduced to the standby clutch pressure Pw in the reverse setting of the clutch, i.e., that the reverse clutch can be fitted at the maximum value Pm is increased.

In the engine condition analyzing circuit 41, a function map for obtaining the threshold value ENs of the engine speed EN is stored as a factor of the ship velocity V (forward ship velocity Vf). Based on the function map, it is judged whether the reverse clutch pressure Pr is to be increased to the maximum value Pm or reduced to the standby clutch pressure Pw in the reverse setting. It is also possible to store a map for setting the optimum standby clutch pressure Pw according to each the threshold value ENs.

Figure 9:
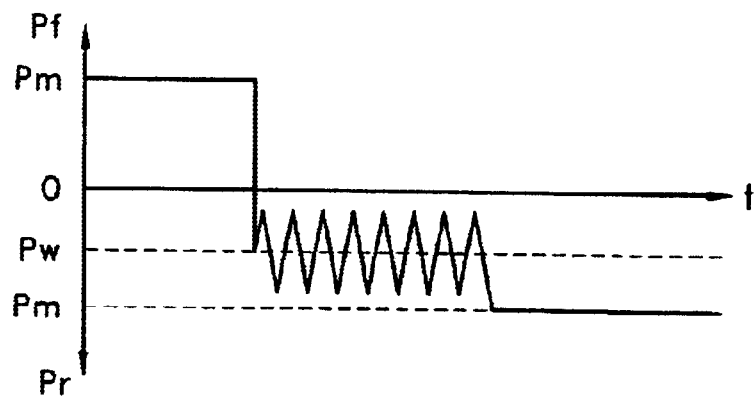
FIG. 9 shows the clutch hydraulic pressure over time when standby clutch pressure is varied up and down.

Moreover, in the control shown in FIG. 8, control for maintaining the standby clutch pressure Pw until the ship velocity V (forward ship velocity Vf) becomes zero is carried out in reverse setting of the clutch. In other words, the above-described control for increasing the reverse clutch pressure Pr to the maximum value Pm after maintaining the reverse clutch pressure Pr at the standby clutch pressure Pw for a certain time period is not carried out. However, because the reverse clutch pressure Pr stays at the Bow standby clutch pressure Pw during the reverse setting, it is impossible to apply braking force due to effective reverse driving force to the propeller 7. Therefore, as shown in FIG. 9, it is possible to consider varying the reverse clutch pressure Pr up and down in a wave shape from the standby clutch pressure Pw. Thus, it is possible to apply the braking force to the propeller 7 in stages.

Such up-and-down variations of the clutch pressure in the wave shape can be applied to the hydraulic control shown in FIGS. 4 and 5 and the hydraulic control shown in FIGS. 6 and 7.

Furthermore, in the present control, a control for increasing the reverse clutch pressure Pr from the standby clutch pressure Pw to the maximum value Pm is carried out at the time of the ship velocity V=0. Because the propeller 7 which has been rotating forward stops at the time of V=0, by raising the reverse clutch pressure Pr to the maximum value Pm, the reverse driving force is effectively applied to the propeller 7 and the ship stops and then can move on to the reverse traveling without a shock (i.e., the reverse velocity Vr increases).

Figure 10:
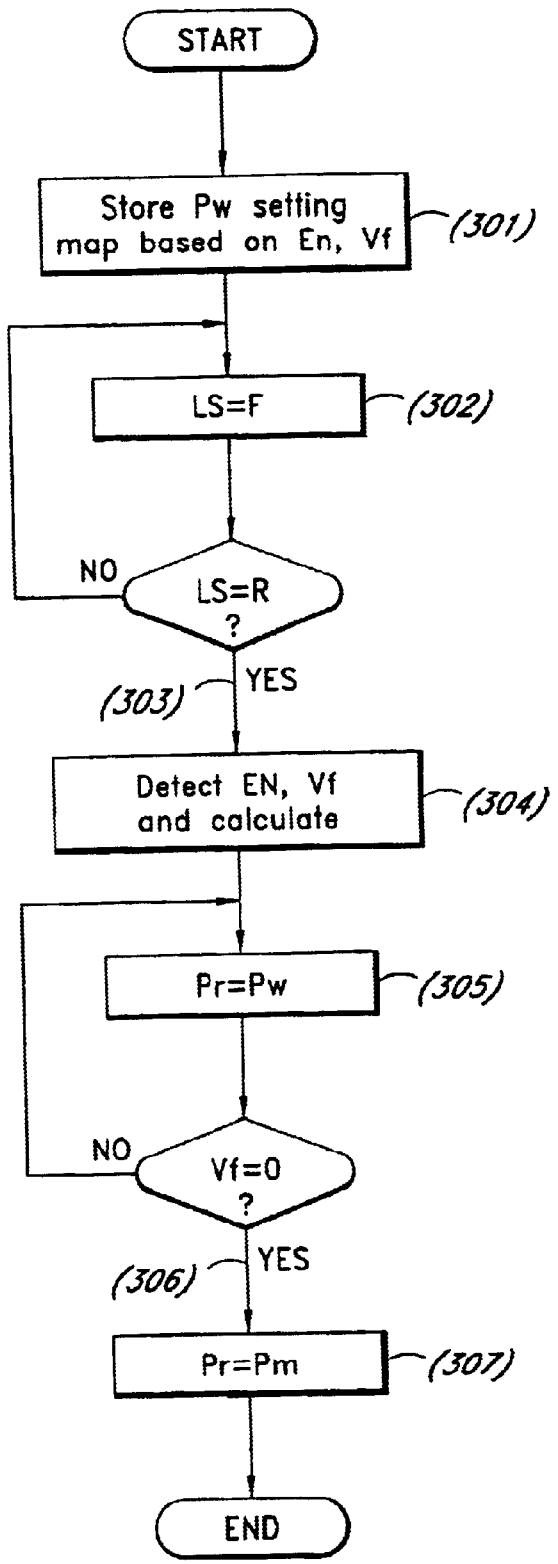
FIG. 10 is a flow chart of the clutch hydraulic pressure control in the crash-go-astern operation based on detection of the engine speed and the ship velocity according to the invention.

By reference to FIG. 8, a course of a clutch hydraulic control shown in FIG. 10 will be described. In the controller 50, a setting map of the standby clutch pressure Pw based on the engine speed EN and the forward ship velocity Vf is stored in advance as described above (step 301). If a shift from the crash-go-astern operation, i.e., a state of the clutch position sensor value LS=F (step 302) to LS=R is found (step 303) by detection of the position of the clutch lever 2a, the engine speed threshold value ENs is obtained and the standby clutch pressure Pw is calculated by reading of the engine speed EN and the ship velocity V (forward ship velocity Vf) (step 304), based on which the fitting pressure Pr of the reverse clutch 90 is set at the standby clutch pressure Pw (step 305) and the ship velocity V becomes zero (step 306). After that, the fitting pressure Pr of the reverse clutch 90 is increased to the maximum value Pm irrespective of the threshold value ENs (step 307).

As described above, by using the method of the invention, during execution of the crash-go-astern operation, because the reverse clutch 90 is engaged constantly even with low fitting pressure after the clutch lever 2a is once moved to the reverse position and a slight reverse driving force is applied to the propeller 7 even during standby for avoiding stalling, it is possible to gradually apply a load to the propeller to brake while reducing a load applied to the engine to thereby shorten time required for stopping the ship.

Figure 11:
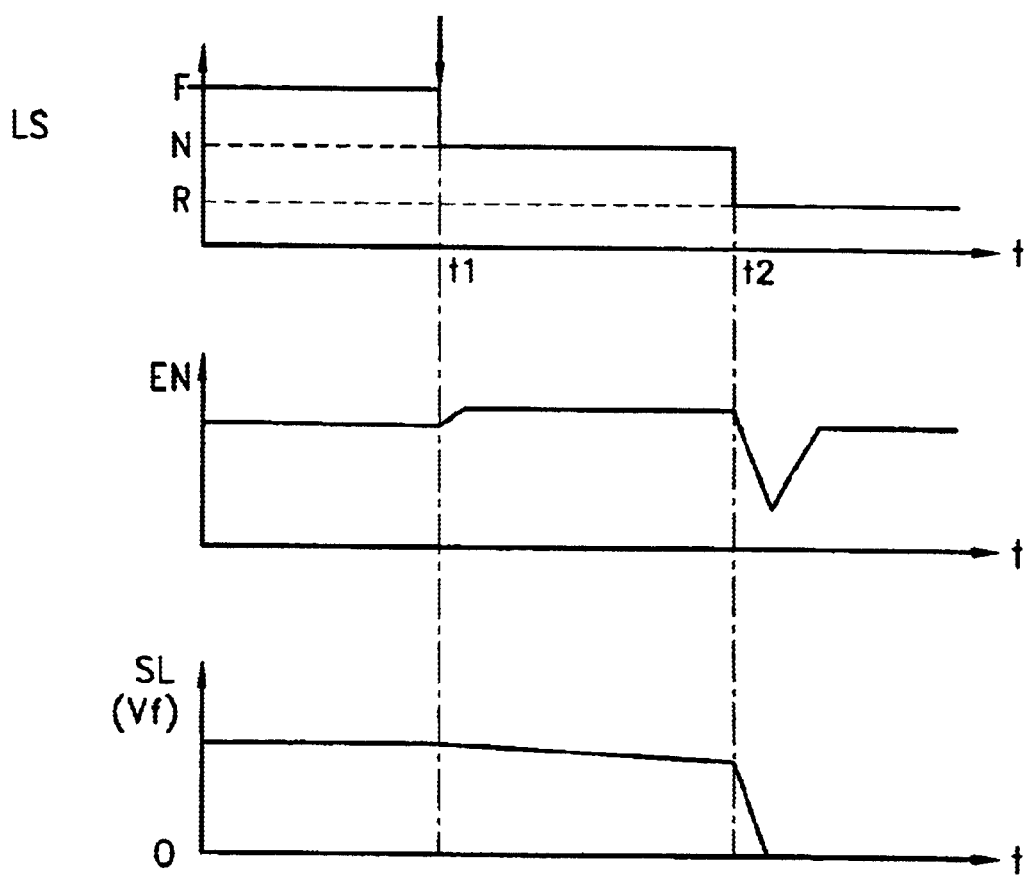
FIG. 11 shows the clutch lever signal value, the engine speed, and the ship load (ship velocity) over time for explaining timing of judgement of the standby clutch pressure or initial fitting pressure for avoiding stalling.

The above three clutch control methods in the crash-go-astern are the control methods in which, when clutch operating means (clutch lever 2a) is moved the reverse set position, in process of increasing the reverse clutch pressure Pr to the maximum value Pmax at one time, the reverse clutch pressure Pr is reduced to the standby clutch pressure Pw for avoiding the stalling in some cases based on detection of various engine conditions. In other words, as shown in FIG. 11, timing of detection (of the engine speed, the engine load, and the like, for example) for controlling the reverse clutch pressure Pr is time $t_2$ when the clutch lever 2a is switched from the neutral position to the reverse position.

In these control methods, however, detection of the engine conditions which are criteria of judgement of if the reverse clutch pressure Pr is, reduced to the standby clutch pressure Pw is late and the control may be delayed.

On the other hand, in a control method described as follows, before the crash-go-astern operation, initial fitting pressure of the reverse clutch pressure Pr is set in advance based on certain criteria of judgement at the time during forward traveling and the reverse clutch pressure Pr is first set at the initial fitting pressure when the clutch operating means is switched to the reverse set position. In other words, time $t_1$ when the clutch lever detected value LS shifts from a forward value F to a neutral value N in FIG. 11 is employed as detection timing of the criteria of judgement for controlling the reverse clutch pressure Pr. As a result, as soon as the clutch lever 2a is switched to the reverse position, the reverse clutch pressure Pr becomes the initial fitting pressure Po calculated based on the detection.

In the present control method, as a criterion of prediction and judgement of the initial fitting pressure of the reverse clutch pressure Pr, a load applied to the ship due to water drag, driving of the engine, and the like at a certain vehicle velocity, i.e., a load characteristic (ship load) SL intrinsic to the ship is used. If the vehicle velocity is V and a constant intrinsic to the ship is K, the ship load SL is obtained as SL=V*K, i.e., a value proportional to the ship velocity V. The constant K intrinsic to the ship is obtained by considering a shape of the propeller, a shape and weight of the ship, engine torque, and the like which are characteristics of the ship. If the ship load SL is obtained, it is possible to roughly predict a drop in the engine speed EN when the reverse clutch 90 is fitted from the neutral state.

In other words, when the ship is navigated at a certain engine speed EN and a certain propeller speed PN in traveling ahead, what determines a drop amount of the engine speed EN in fitting of the reverse clutch 90 by the crash-go-astern operation is the ship load SL.

The ship load SL is proportional to the ship velocity V (Vf) as described above and the ship velocity V is affected by the propeller speed PN. Therefore, in the crash-go-astern operation, if the propeller speed PN at the time of neutral between the forward setting and the reverse setting is obtained, the ship load SL from the neutral state to fitting of the reverse clutch can be obtained proportionally and the drop amount of the engine speed EN can be predicted based on the ship load SL. It is possible to obtain the initial fitting pressure Po of the reverse clutch pressure Pr such that the engine speed EN which reduces de to the clutch fitting does not reduce to a stalling danger region.

Therefore, in the clutch mechanism 100, if the propeller speed PN in the neutral state is detected when the mechanism 100 shifts from the fit state of the forward clutch 10 to the neutral state, it is possible to calculate the optimum initial fitting pressure Po of the reverse clutch pressure Pr according to the propeller speed PN.

Figure 12:
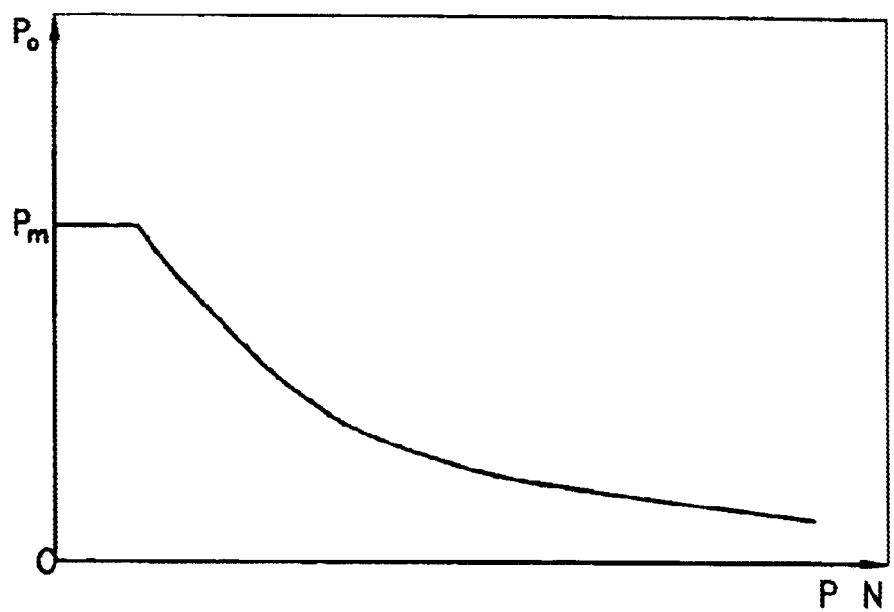
FIG. 12 is a setting map of the initial fitting pressure corresponding to a propeller speed in neutral shifting in the crash-go-astern operation formed based on a characteristic of the ship load.
Figure 13:
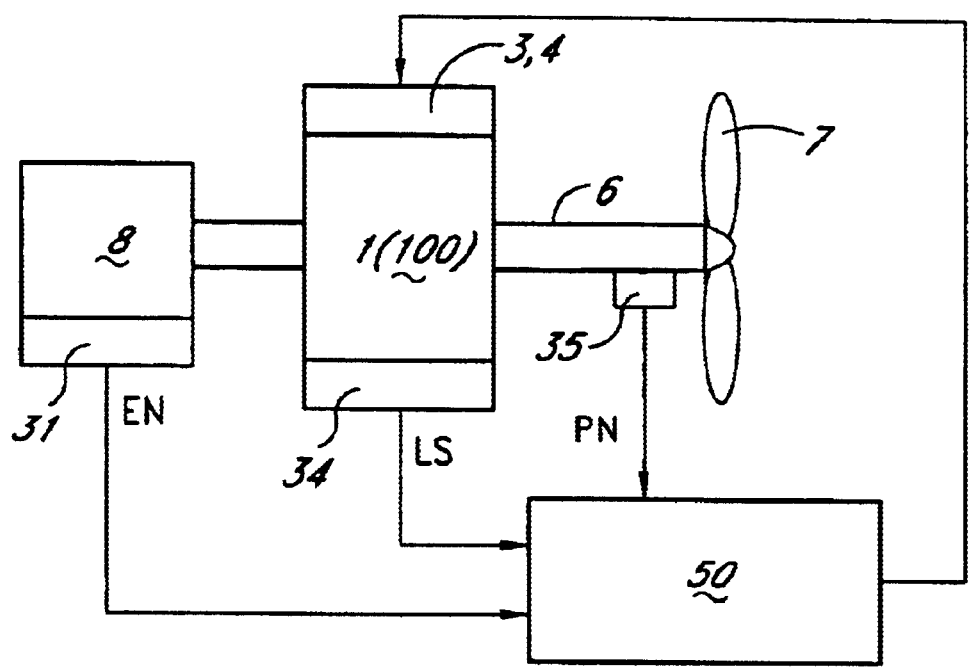
FIG. 13 is a control block diagram for carrying out clutch hydraulic pressure control by setting the initial fitting pressure based on the ship load.

A correlation map between the propeller speed PN in the neutral state in the crash-go-astern operation and the initial fitting pressure Po of the reverse clutch pressure Pr as shown in FIG. 12 is formed for each ship according to a characteristic of the ship load SL intrinsic to the ship and stored in a controlling controller 50 of the clutch mechanism 100 shown in FIG. 13.

The initial fitting pressure Po is set such that the engine speed EN which reduces due to initial fitting of the reverse clutch 90 does not reduce to the stalling danger region. The higher the propeller speed PN, the larger the drop amount of the engine speed EN is. Therefore, the initial fitting pressure Po is set at the small value such that a load applied from the propeller side to the engine side due to the initial fitting of the reverse clutch 90 is reduced. When the propeller speed PN is extremely low, the initial fitting pressure Po is set at the maximum value Pm of the reverse clutch Pr. The smaller the propeller speed PN, the more the ship velocity Vf has reduced. Therefore, it is unnecessary to apply large reverse driving force which functions as the propeller braking force and, as a result, the initial fitting pressure Po can be reduced.

FIG. 13 shows a schematic block diagram for carrying out the present hydraulic pressure control. In this case, into the clutch controlling controller 50, detection signals are input from the engine speed sensor 31 attached to the engine 8, the clutch lever position sensor 34 attached to the reduction and reverse gear 1, and the propeller speed sensor 35 attached to the propeller shaft 6 are input. The controller 50 sends output signals to the direct-coupled solenoid valve 3 and the solenoid proportional valve 4 of the reduction and reverse gear 1 to control the forward clutch pressure Pf and the reverse clutch pressure Pr.

Figure 15:
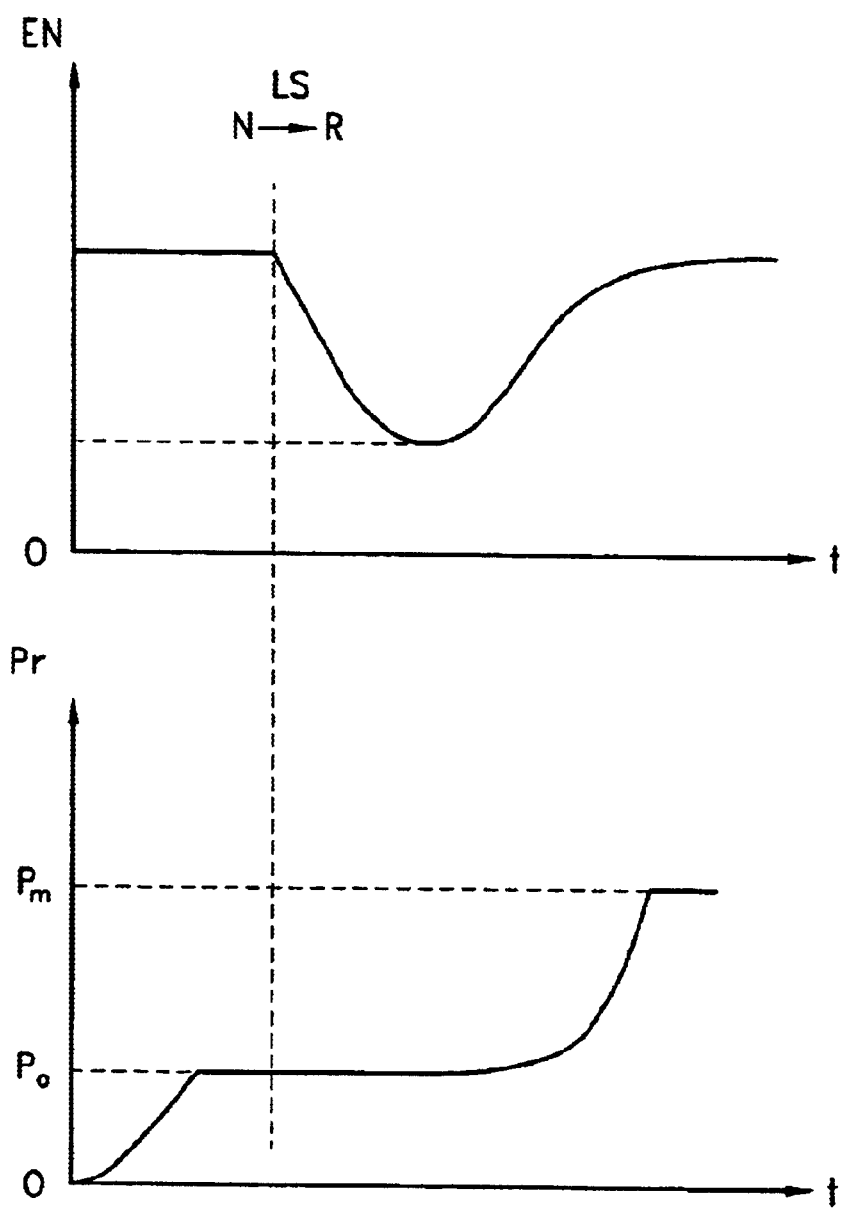
FIG. 15 shows the engine speed and the reverse clutch pressure over time from neutral setting to reverse setting during the crash-go-astern operation.

FIG. 15 shows a relationship between the engine speed EN and the reverse clutch pressure Pr until the clutch mechanism 1 is switched from the neutral state to the reverse driving state in the crash-go-astern operation. First, an assumption that the reverse clutch pressure Pr at the time of neutral is substantially zero as described above is made. As described above, at the time of neutral, the initial fitting pressure Po of the reverse clutch 90 corresponding to the propeller speed PN which is a detected value from the propeller speed sensor 34 is determined based on the map shown in FIG. 13. Based on the initial fitting pressure Po, output control signals are transmitted from the controller 50 to the direct-coupled solenoid valve 3 and the solenoid proportional valve 4 to raise the reverse clutch 90 to the initial fitting pressure Po by the time the clutch lever 2a is shifted from the neutral position N to the reverse position R.

When the clutch lever 2a is switched to the reverse setting R, the engine speed EN reduces due to the initial fitting of the reverse clutch 90 and then increases. The higher the engine speed EN, the more reverse driving force which acts as the braking force on the propeller 7 can be applied without a fear of stalling. Therefore, by increasing the reverse clutch pressure Pr as the engine speed EN increases, the more braking force is added to the propeller 7 to shorten the time required for stopping the ship.

A course of the above series of control will be described by using a flow chart in FIG. 14. In the controller 50, the map of the initial fitting pressure Po of the reverse clutch pressure Pr corresponding to the propeller speed PN based on the characteristic of the ship load SL is stored in advance as described above (step 401). When the clutch lever position sensor value LS changes from the forward value F to the neutral value N (steps 402 to 403), the propeller speed PN at that time is obtained and the initial fitting pressure Po of the reverse clutch pressure Pr is obtained by using the map (step 404). Then, by the time the clutch lever position sensor value Ls changes from the neutral value N to the reverse value R, the reverse clutch pressure Pr (by this time, Pr=0) is increased to the initial fitting pressure Po (step 405). As a result, at the time when the clutch lever 2a is set in the reverse position R (step 406), the reverse clutch 90 is at the initial fitting pressure Po which has been set swiftly. Although the engine speed EN reduces at one time due to the fitting pressure, because the reverse clutch pressure Pr is the initial fitting pressure Po calculated in advance by using the map based on the ship load SL the engine speed EN reduces in a range without a fear of stalling without delay in control.

Then, the engine speed EN increases. At this time, the reverse clutch pressure Pr is increased according to the increase in the engine speed (step 407) and raised to the maximum value Pm, the reverse clutch 90 is fitted smoothly, and the reverse driving force is effectively applied to the propeller 7 to brake.

FIG. 15 shows the engine speed EN and the reverse clutch pressure Pr over time through the neutral state and the reverse set state of the clutch mechanism 100 in the crash go astern operation. The reverse clutch pressure Pr has been raised to the initial fitting pressure Po by the time the clutch lever detected value LS is switched from the neutral value N to the reverse value R and stays at the initial fitting pressure Po for a while after the switch to the reverse value R. During this period, the engine speed EN reduces as soon as the clutch lever 2a is switched to the reverse position R and the reverse clutch 90 is fitted at the initial fitting pressure Po. However, the reverse driving force applied to the propeller 7 through the reverse clutch 90 fitted at the initial fitting pressure Po does not apply such a load as to cause stalling to the engine 8. Therefore, the engine speed EN increases soon. Because the reverse clutch pressure Pr is increased to follow the increase pattern, the reverse driving force as the braking force is effectively applied to the propeller 7.

It is difficult to obtain the characteristic of the ship load as described above in some cases. In other words, the constant K cannot be obtained in the above-described SL=V*K in some cases. The estimated ship load SL may deviate from an actual value in some cases. In order to cope with such cases, it is possible that the map of the initial fitting pressure Po corresponding to the propeller speed PN based on the estimated characteristic of the ship load is corrected according to the drop amount ΔEN of the engine seed EN when the clutch mechanism 100 is switched to the reverse setting.

Figure 16:
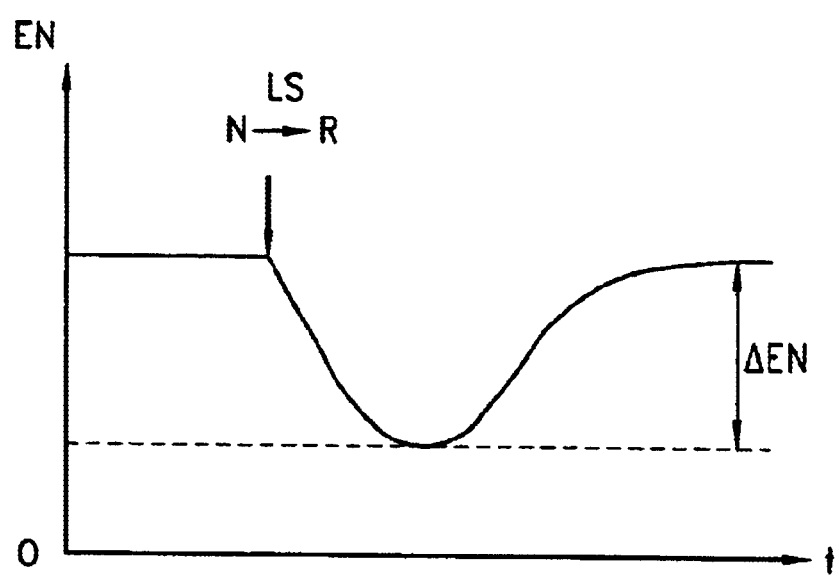
FIG. 16 shows the engine speed over time to show a drop amount of the engine speed.

As shown in FIG. 16, if the clutch mechanism 100 is switched from the neutral state to the reverse driving state (i.e., if the clutch lever 2a is switched from the neutral position N to the reverse position R), the engine speed EN drops. However, the drop amount ΔEN changes according to the degree of the ship load SL. Therefore, the ship load SL is corrected based on the drop amount ΔEN. The map of the initial fitting pressure Po corresponding to the propeller speed PN is corrected based on the corrected ship load SL and, as a result, the initial fitting pressure Po can be corrected to be a proper value.

The corrected initial fitting pressure Po calculated based on the corrected ship load SL is obtained as follows, for example.

$$Po=(\Delta EN_1 - \Delta EN_0) * Po_1 * a$$

, where $\Delta EN_1$ is the actual drop amount of the engine speed, $\Delta EN_0$ is the drop amount of the engine speed EN used for estimating the ship load SL before correction, Poi is the initial fitting pressure Po detected by using the ship load SL before correction, and a is a gain constant.

By correcting the estimate of the ship load SL and calculating the initial fitting pressure Po based on the corrected value as described above, it is possible to immediately correct the estimated initial fitting pressure $Po_1$ to the proper Po to fit the reverse clutch 90 so as to effectively apply the braking force while avoiding the stalling even if the reverse clutch pressure Pr set at the initial fitting pressure Po is higher or lower than the proper pressure because of a deviation of the estimated drop amount of the engine speed from the actual amount.

Figure 17:
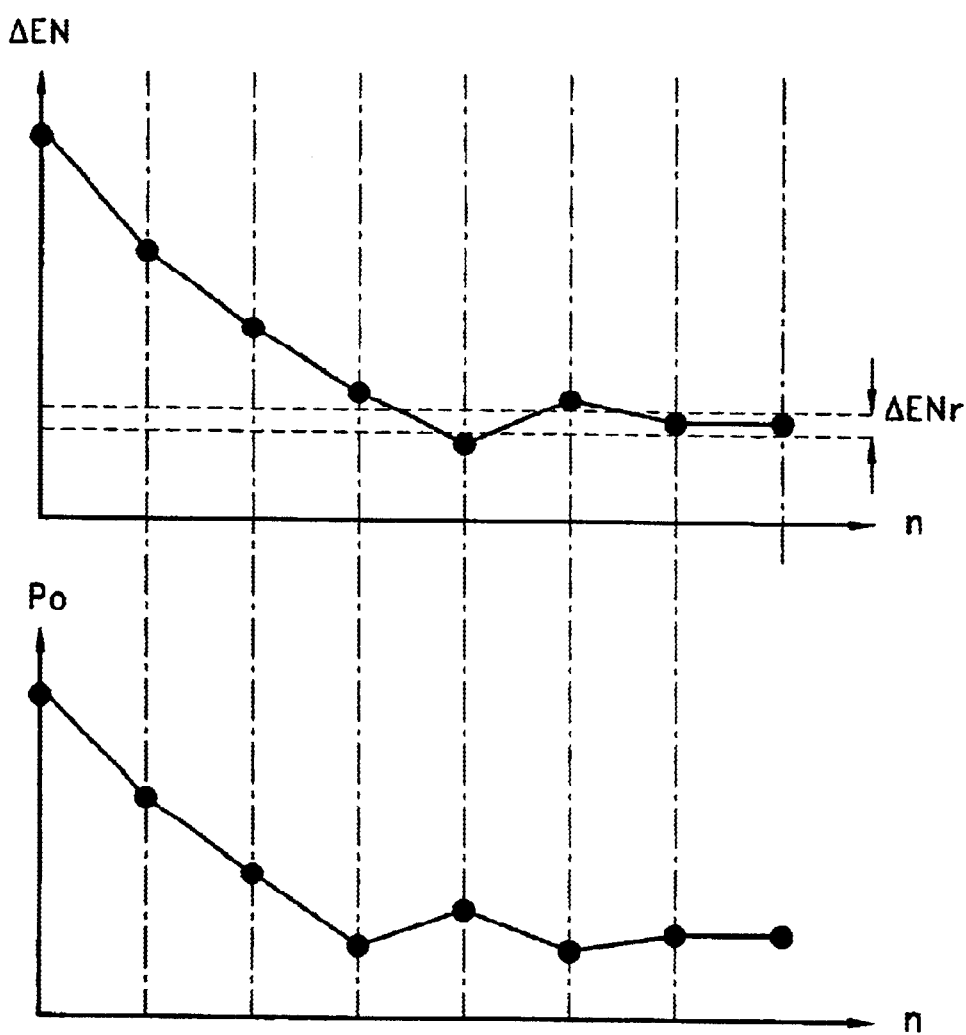
FIG. 17 shows progression of the drop amount of the engine speed and the initial fitting pressure after respective correcting operations for causing the drop amount of the engine speed to converge into a target range.

The correction of the ship load SL by reading the drop amount ΔEN of the engine speed may be repeated until the drop amount converges into a certain target range. In other words, the drop amount ΔEN of the engine speed EN reduces as the initial fitting pressure Po of the reverse clutch 90 reduces and increases as the initial fitting pressure Po increases because the higher the initial fitting pressure Po, the higher load is applied to the engine due to the clutch fitting. Therefore, as shown in FIG. 17, such a drop amount of the engine speed that the initial fitting pressure Po of the reverse clutch 90 becomes the proper value is set in advance as a certain target drop amount range ΔENr. The above correction of the ship load SL is repeated such that the drop amount ΔEN of the engine speed converges into the target drop range ΔENr and eventually changes the set map of the initial fitting pressure corresponding to the propeller speed shown in FIG. 12 to adjust the initial fitting pressure Po to a proper value.

For example, the drop amount ΔEN of the engine speed can converge into the target range ΔENr by reducing the initial fitting pressure Po in the next correction if the drop amount ΔEN of the engine speed is larger than an upper limit of the target range ΔENr and by increasing the initial fitting pressure Po in the next correction if the drop amount ΔEN of the engine speed is smaller than a lower limit of the target range ΔENr as shown in FIG. 17. In FIG. 17, a horizontal axis n indicates the number of corrections.

By repeating the ship load SL to adjust the initial fitting pressure Po such that the drop amount ΔEN of the engine speed converges into the proper range ΔENr, it is possible to reliably avoid the stalling and efficiently and abruptly stop in the crash-go-astern operation.

If the number of corrections of the ship load SL until the drop amount ΔEN in the engine speed converges into the proper range ΔENr is substantially constant, the number n of corrections may be set in advance.

If the drop amount ΔEN of the engine speed deviates again from the target range ΔENr because the ship load SL changes due to secular changes and the like of the ship and the propeller 7 after the drop amount ΔEN of the engine speed converges into the range ΔENr at one time, the ship load SL is corrected again to adjust the initial fitting pressure Po such that the drop amount ΔEN of the engine speed converges into the range ΔENr.

Figure 14:
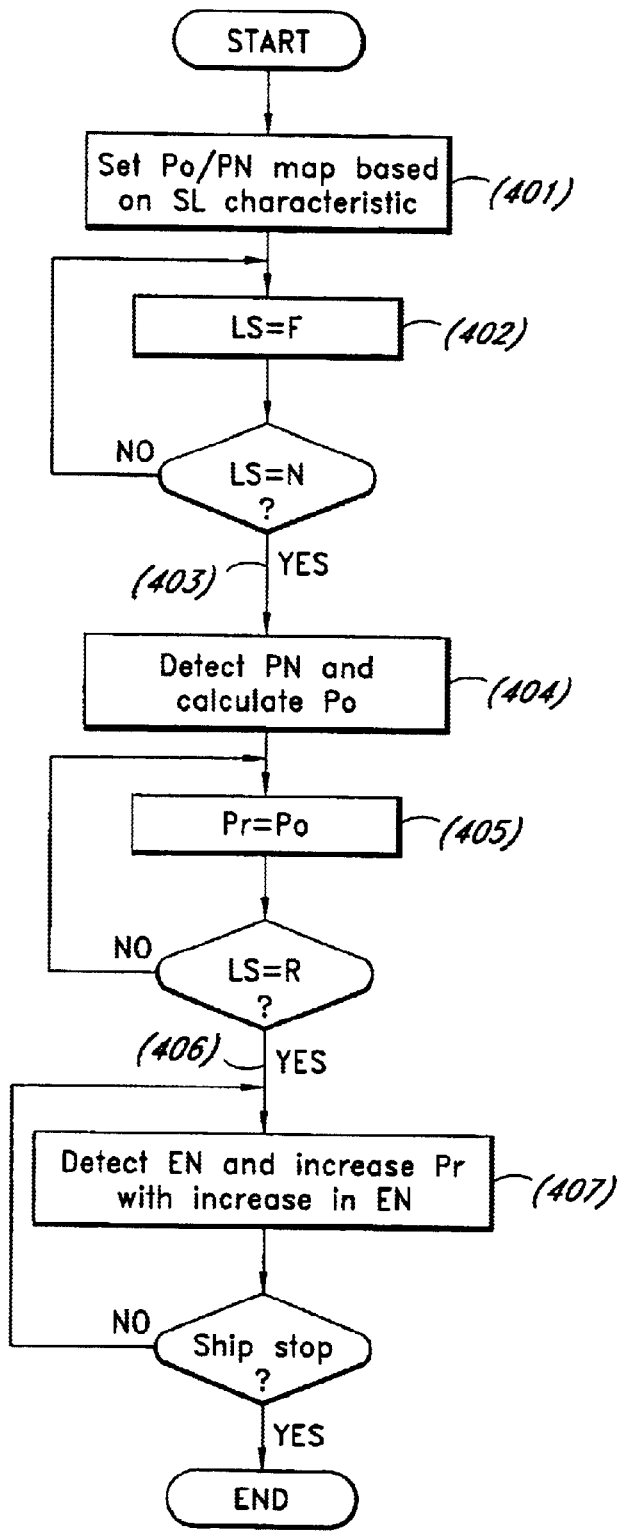
FIG. 14 is a flow chart of a clutch pressure control in the crash-go-astern operation for setting the initial fitting pressure according to a detected propeller speed by using a map based on the ship load before reverse setting to control reverse clutch pressure according to the invention.
Figure 18:
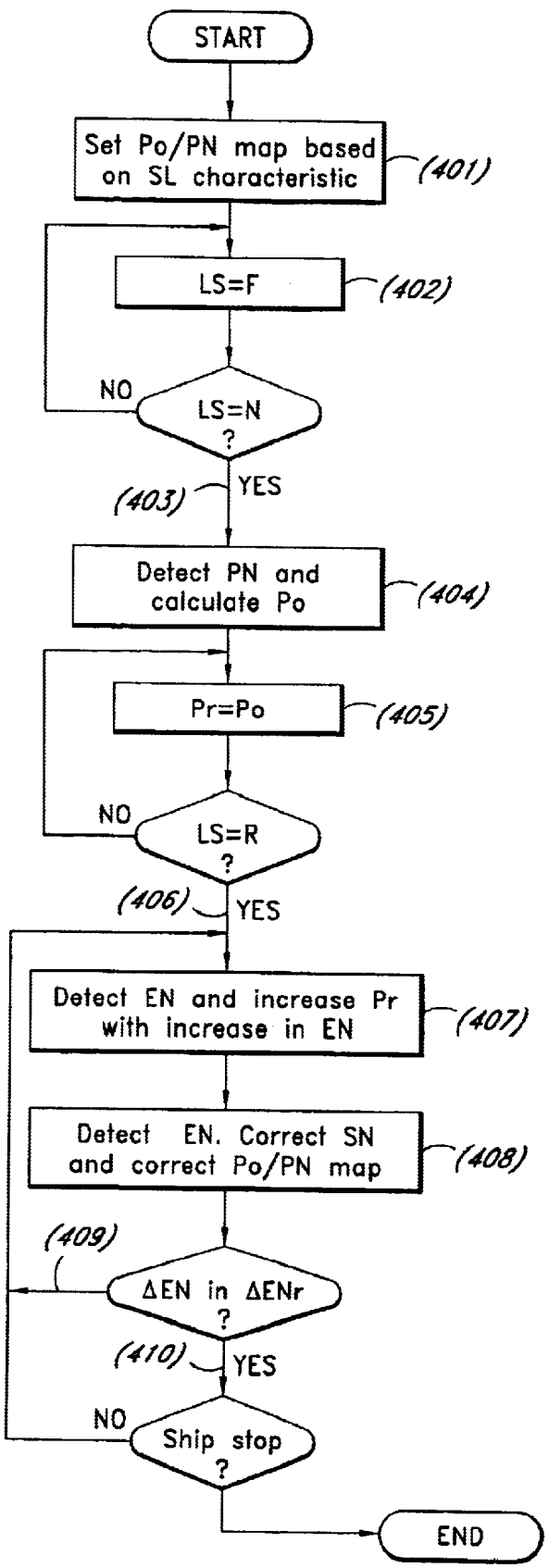
FIG. 18 is a flow chart formed by adding a course of map correction based on correction of the ship load by reading the drop amount of the engine speed to a course of the control in FIG. 14.

A flow chart in FIG. 18 is formed by adding a correcting step (step 408) of the initial fitting pressure Po by correction of the map by reading the drop amount ΔEN to the flow Chart in FIG. 14 and the correction is repeated (steps 409 and 410) until the engine speed drop amount ΔEN converges into the target range ΔENr.

POSSIBILITY OF INDUSTRIAL APPLICATION

As described above, the invention provides an effective hydraulic clutch control method in the crash-go-astern operation of the ship mounted with the marine reduction and reverse gear having the hydraulic forward clutch and reverse clutch.

What is claimed is:

1. A hydraulic clutch control method of a marine reduction and reverse gear in a crash-go-astern operation, for switching operating means of a hydraulic clutch mechanism provided to the marine reduction and reverse gear from a forward setting to a reverse setting in a stroke so as to abruptly stop a ship traveling forward, said method comprising the steps of:
    (i) when switching the operation means from the forward setting to the reverse setting, changing a clutch pressure from a forward driving clutch pressure to a reverse driving clutch pressure via a neutral pressure;
    (ii) if it is judged that there is a fear of stalling due to a shock of the clutch switching in the operation, dropping and maintaining the reverse driving clutch pressure at a predetermined standby clutch pressure set between the neutral pressure and a maximum pressure of the reverse driving clutch pressure and suitable for avoiding stalling;
    (iii) if it is judged that there is no fear of said stalling, increasing the reverse driving clutch pressure; and
    (iv) repeating steps (ii) and (iii) until the crash-go-astern operation becomes stable.

2. The hydraulic clutch control method of a marine reduction and reverse gear in a crash-go-astern operation according to claim 1, wherein a threshold value of an engine speed is set as a criterion of judgement of a state in which there is fear of said stalling and a detected engine speed and the threshold value are compared with each other.

3. The hydraulic clutch control method of a marine reduction and reverse gear in a crash-go-astern operation according to claim 1, wherein a threshold value of a load applied to an engine is set as a criterion of judgement of a state in which there is said fear of said stalling and a detected degree of a load applied to said engine and said threshold value are compared with each other.

4. The hydraulic clutch control method of a marine reduction and reverse gear in a crash-go-astern operation according to claim 1, wherein an engine speed and a ship velocity are detected as a criteria of judgement of a state in which there is said fear of said stalling.

5. The hydraulic clutch control method of a marine reduction and reverse gear in a crash-go-astern operation according to claim 1, wherein the fitting pressure of the reverse driving clutch is first increased to the maximum value as a target when the operating means of said hydraulic clutch mechanism is switched to the reverse setting in said crash-go-astern operation and the fitting pressure is reduced to said standby clutch pressure if it is judged that there is the fear of the stalling in a process of increasing of the fitting pressure.

6. The hydraulic clutch control method of a marine reduction and reverse gear in a crash-go-astern operation according to claim 5, wherein a threshold value of an engine speed is set as a criterion of judgement of a state in which there is fear of said stalling and a detected engine speed and the threshold value are compared with each other.

7. The hydraulic clutch control method of a marine reduction and reverse gear in a crash-go-astern operation according to claim 5, wherein a threshold value of a load applied to an engine is set as a criterion of judgement of a state in which there is said fear of said stalling and a detected degree of a load applied to said engine and said threshold value are compared with each other.

8. The hydraulic clutch control method of a marine reduction and reverse gear in a crash-go-astern operation according to claim 5, wherein an engine speed and a ship velocity are detected as a criteria of judgement of a state in which there is said fear of said stalling.

9. The hydraulic clutch control method of a marine reduction and reverse gear in a crash-go-astern operation according to claim 1, wherein said standby clutch pressure until said engine gets out of a state in which there is said fear of said stalling when said operating means of said clutch mechanism has been switched to the reverse setting is increased and reduced repeatedly at or below the maximum value of the clutch fitting pressure as an upper limit.

10. The hydraulic clutch control method of a marine reduction and reverse gear in a crash-go-astern operation according to claim 1, wherein increase in the fitting pressure of the reverse driving clutch based on a judgement of a state in which there is no fear of stalling is carried out according to an increase in the engine speed.

11. The hydraulic clutch control method of marine reduction and reverse gear in a crash-go-astern operation according to claim 1, wherein increase in the fitting pressure of the reverse driving clutch based on a judgment of a state in which there is no fear of said stalling is carried out according to a reduction in an engine load.

12. A hydraulic clutch control method of a marine reduction and reverse gear in a crash-go-astern operation for switching operating means of a hydraulic clutch mechanism provided to the marine reduction and reverse gear from a forward setting to a reverse setting in a stroke so as to abruptly stop traveling forward, said method comprising the steps of:

calculating an initial fitting pressure of a reverse driving clutch from a criterion of judgement of a ship in advance before the switching to said reverse setting;

when switching the operation means from the forward setting to the reverse setting, changing a clutch pressure from a forward driving clutch pressure to the initial fitting pressure via a neutral pressure; and increasing the fitting pressure of the reverse setting when the crash-go-astern operation becomes stable.

13. The hydraulic clutch control method of a marine reduction and reverse gear in a crash-go-astern operation according to claim 12, wherein said initial fitting pressure is increased to a maximum value according to an increase in the engine speed.

14. The hydraulic clutch control method of a marine reduction and reverse gear in a crash-go-astern operation according to claim 12, wherein said criterion of judgement is a propeller speed when the clutch mechanism is switched from the forward setting to a neutral state by said crash-go-astern operation.

15. The hydraulic clutch control method of marine reduction and reverse gear in a crash-go-astern operation according to claim 14, wherein calculation of said initial fitting pressure is performed based on a setting map of said initial fitting pressure corresponding to the propeller speed detected in the neutral state and the map is formed based upon a load characteristic intrinsic to a ship.

16. The hydraulic clutch control method of a marine reduction and reverse gear in a crash-go-astern operation according to claim 15, wherein said estimated load characteristic intrinsic to ship is corrected according to a drop amount of an actual engine speed when the reverse driving clutch is set at the initial fitting pressure and said map is corrected according to the corrected load characteristic.

17. The hydraulic clutch control method of a marine reduction and reverse gear in a crash-go-astern operation according to claim 16, wherein said correction of the load characteristic intrinsic to the ship is repeated until the drop amount of the actual engine speed when the reverse driving clutch is set at the initial fitting pressure converges into a target range.

18. The hydraulic clutch control method of a marine reduction and reverse gear in a crash-go-astern operation according to claim 17, wherein the number of corrections of said load characteristic intrinsic to the ship is set in advance.

19. The hydraulic clutch control method of a marine reduction and reverse gear in a crash-go-astern operation according to claim 17, wherein the correction of the load characteristic intrinsic to the ship is carried out again when the drop amount of the engine speed which has converged into the target range at one time deviates again from the target range.

\* \* \* \* \*